July 21, 1936.  M. EWEIS  2,048,633
PISTON RING
Filed March 6, 1935
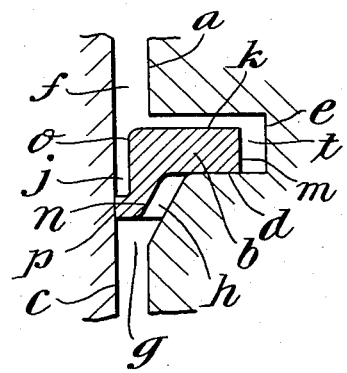
INVENTOR.
MOHAMED EWEIS
ATTORNEY.

Patented July 21, 1936

2,048,633

UNITED STATES PATENT OFFICE 2,048,633

PISTON RING

Mohamed Eweis, Cairo, Egypt

Application March 6, 1935, Serial No. 9,602
In Great Britain March 12, 1934

1 Claim. (Cl. 309—31)

This invention relates to a pressure sealing ring for pistons used in fluid pressure engines. With the usual ring of rectangular cross section, fitting in a similarly cross sectioned groove owing to the fluid pressure behind the ring due to the leakage from the high pressure space, the outward pressure on the ring is very close to the pressure acting in the high pressure space, with consequent wear of ring and cylinder wall, due to this fluid pressure.

The bearing stress and friction between ring and wall are not materially reduced if an annular recess is cut in the ring between a part of its depth and the cylinder wall open towards the fluid pressure space, since although the inward pressure exerted in said recess will result in a reduction in the total outward pressing force, the bearing stress between the remaining portion of the sealing surface of the ring and the cylinder wall is substantially unaffected as the bearing area is reduced in the same proportion as the reduction in the outward pressing force. The cutting of the annular groove is in fact equivalent only to a reduction of the height of the ring.

An object of this present invention is to provide a pressure sealing ring and piston assembly resulting in minimum wear between the ring and cylinder wall. A further object is to provide a construction of ring and piston in which the bearing pressure between ring and cylinder wall can be of any pre-arranged desired practical value.

These and other objects of the invention will be apparent from the following description, which has reference to the accompanying drawing illustrative of a piston ring constructed in accordance with the invention.

Referring to the drawing $a$ represents the piston, $b$ the piston ring, $c$ the wall of the cylinder, and $d$ the lower seating in a groove $e$ of the said piston. Presuming that the highest pressure is exerted above the piston ring $b$ from the space $f$ and that it is prevented from blowing under the lower face of the said piston ring $b$ owing to the sealing effect of same, the said piston ring $b$ resting on the lower seating $d$, then owing to the play of the piston ring $b$ in its groove $e$, a passage is given to the fluid from the space $f$ above the ring to the space $t$ behind the same, so that the pressure behind the said ring $b$ must be very close to the pressure acting in the space $f$.

The piston ring is of substantially L-cross sectional shape with the skirt so formed providing in conjunction with the piston suitably shaped, an angular recess $h$ whilst a cut away peripheral portion forms in conjunction with the cylinder wall a recess $j$, which extends downwardly from the upper face $k$ of the said piston ring $b$.

The piston ring $b$ rests on the lower seating $d$ in the groove $e$, and on the inner peripheral wall $a$ of the said ring $b$ acts the pressure from the space $f$, said pressure being throttled down to a certain pressure acting in space $g$. Said latter pressure, which is smaller than the pressure from the space $f$ aforesaid, acts behind the bottom part $n$ of the piston ring $b$, whilst on the surface $o$ of the outer peripheral recess $j$ acts the pressure from the space $f$ aforesaid.

It is clear therefore that the outer peripheral recess $j$ can be given such a depth that the action of the pressure on the surface $o$ of said recess $j$ counteracts the whole or any desired part of the outward pressing force on the ring, due to the static pressure of the ring and the action of the pressure from above and below the piston ring $b$, on the back surfaces $m$ and $n$ of same, even when the pressure exerted behind the upper part $m$ attains the value of the pressure acting in the space $f$.

Thus any desired bearing pressure can be arrived at between the piston ring $b$ and the wall $c$ of the cylinder at the sealing surface at $p$ so that the wear of the said parts is reduced to a minimum.

It will be understood that although the invention has been described and is hereafter claimed with reference to a single piston ring, two or more rings will as in present day practice, be employed.

I claim:

A pressure sealing ring for fluid pressure engines having a piston reciprocating within a cylinder and having ring receiving grooves, comprising a substantially L cross sectional shaped ring including a skirt portion extending towards the low pressure space, a groove engaging portion, a cut away outer peripheral portion adapted to form in conjunction with the cylinder wall a recess open towards the fluid pressure space, a cut away peripheral portion of the piston adapted to form in conjunction with the inner surface of the skirt a recess open towards the low pressure space to permit outward pressure on the ring and a bearing surface formed by the peripheral portion of the skirt below the upper recess.

MOHAMED EWEIS.